April 15, 1969 J. R. FESSENDEN ET AL 3,438,485

PACKAGE FOR FILM SHEETS

Filed May 19, 1967

JOHN R. FESSENDEN
WILLIAM G. McDONALD
INVENTORS

BY David P. Ogden
Paul R. Holmes
Walter O. Hodsden
ATTORNEYS 3,438,485

PACKAGE FOR FILM SHEETS

John R. Fessenden and William G. McDonald, Rochester, N.Y., assignors to Eastman Kodak Company, Rochester, N.Y., a corporation of New Jersey Filed May 19, 1967, Ser. No. 639,789
Int. Cl. B65d *83/00, 85/48, 17/00, 5/54, 5/70*
U.S. Cl. 206—56 5 Claims

ABSTRACT OF THE DISCLOSURE

A film sheet package having a wide tear strip across the full length of one surface. So that the package may be remotely opened, the tear strip is folded full length across itself to form a straight line pull tab as distinguished from the usual unwrap pull tab. This arrangement provides a tab which extends from a lightproof enclosure so that pulling it will open a major portion of the package to develop film sheet access without exposing the film.

*Background of the invention*

The present invention relates to a shipping package and more particularly to an improved arrangement for opening such a film sheet package in daylight conditions without exposing the film.

It is well known to package materials such as photographic sheets in an opaque wrapper which is moistureproof so that the photosensitive emulsion will not be exposed to light or be extensively dried or humidified during package handling and storage. According to prior art teachings such a package may be opened in a darkroom and the individual sheets such as X-ray film sheets removed and placed in X-ray exposure equipment. Looking at a diagnostician's task, it is advantageous to use many radiographs to assist in accurate determination of proper remedial treatment. However, with the increased use of X-rays, particularly in the medical field, diagnostic expenses are increased because of handling and developing many radiographs. It is becoming obvious to those most skilled in this art that technicians willing and able to accept the responsibility to develop radiographs without damage or mixup, require salaries substantially above the ordinary clerk or technician.

In order to maintain X-ray diagnostic costs at an acceptable level without sacrificing the quality of radiographs and resulting misdiagnoses of medical cases, a most satisfactory approach requires the use of an automatic X-ray film handling equipment. Such equipment has enclosed compartments to maintain a dark environment and will grasp an X-ray film sheet from an open package of sheets in such a compartment for use in an X-ray exposure cassette. After exposure, cooperating equipment will remove the exposed film sheet from the exposure cassette and present it to a processor to develop a finished radiograph. The now empty cassette automatically receives a fresh film sheet from an open package. In order to accomplish this automatic film sheet loading operation, the package of X-ray films must be accurately positioned and opened with a substantial film surface available to the X-ray sheet film handler.

*Summary of the invention*

Therefore, an object of this invention is to provide an improved X-ray package having a foolproof means for opening the package within an automatic handling equipment.

In accordance with one embodiment of our invention an X-ray package comprises a tray having a flange. A flat surface cover of the tray comprises a rectangular sheet secured to the entire flange periphery and having an integral pull tab folded back across the cover. The cover and pull tab may be multiple layer web material or fabric or a single layer material having the essential orientation for tearing control, lightproof and moistureproof characteristics. According to the present invention, the pull tab folds across the cover so that a substantial edge portion of the cover may be removed by a straight pull on the tab. Moreover, in a specific embodiment the pull tab is longer than the cover so that it extends from a lightproof compartment enclosing the package to facilitate removal of a longitudinal portion of the cover when the lightproof compartment is closed.

*Brief description of the drawing*

The subject matter which is regarded as our invention is particularly pointed out and distinctly claimed in the concluding portion of this specification. The invention, however, as to its organization and operation, together with further objects and advantages, will best be understood by reference to the following description taken in connection with the accompanying drawing, in which:

*Description of the preferred embodiment*

Figure 1:
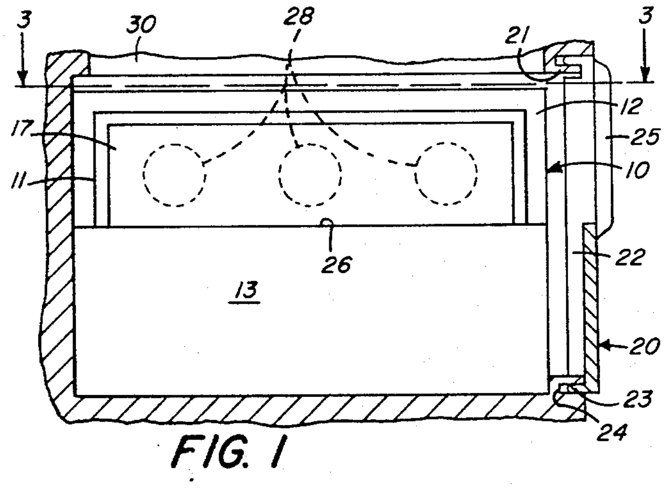
FIG. 1 is an elevation view partially cut away of a light-tight compartment having an opened X-ray film sheet package therein.
Figure 4:
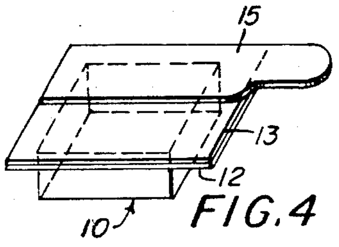
FIG. 4 is a perspective view of the complete package with the pull tab extended.
Figure 2:
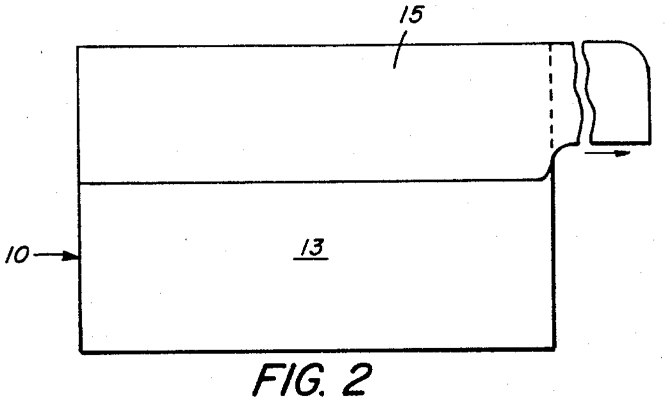
FIG. 2 is a top plan view of a complete X-ray package with the pull tab extended.

Referring now to the drawing, wherein like numbers indicate similar parts, I have shown in FIGS. 1 and 2 a package 10 having an opaque, moistureproof tray portion 11 provided with an outward extending, planar flange 12. Although the flange is shown as being quite wide, it only need be wide enough to provide a good peripheral seal. Secured to the flange 12 is a cover member 13 which is large enough to seal the contents within the tray 11 against moisture and light leaks. Integrally secured to the entire upper section of the cover 13 is a pull tab 15 (FIG. 2) folded over the cover and having a length substantially greater than the cover's full length. The fabric of or a substrate of the cover 13 and the tab 15 is oriented to effectively provide a plurality of tear lines so that when the pull tab 15 is pulled the entire edge section of the cover 13 will be removed. An oriented polymer that works well as a substrate is a polyethylene compression rolled to about one mil. Thus, the cover is opened from flange to flange to provide access to (as shown in FIG. 1) the entire upper portion of a stack of film sheets 17 in the tray 11. The cover should, of course, be reliably light-tight. When a multiple ply cover is used, an opaque aluminum foil and a black heat sealable layer secured to the oriented plastic substrate satisfactorily complete the fabric of the cover 13.

Figure 3:
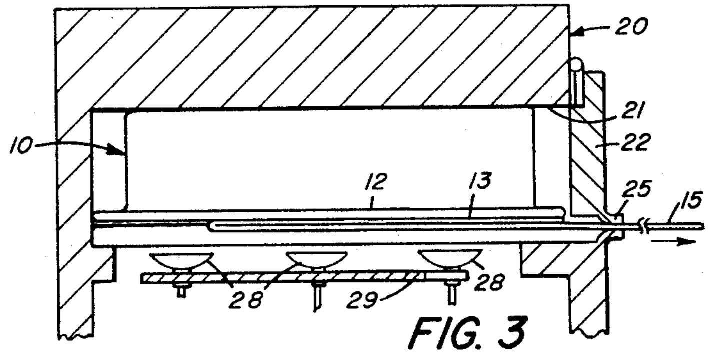
FIG. 3 is a sectional view of the light-tight compartment taken along line 3—3 of FIGURE 1 showing the compartment intact and the package with the cover and pull tab only partially removed therefrom.

As indicated in FIG. 2 the package 10 (a top plan view) has a complete cover 13 uppermost and the pull tab 15 extends entirely across the cover and outward beyond the edge of the flange 12. The package 10 with the pull tab 15 trailing out may be inserted in a sheet handling equipment 20 (FIG. 1) having a compartment 21 covered by a lightproof door 22. As indicated, the door 22 may be provided with a rim 23, which mates with a slot 24 to form a light seal when the door is closed. Once the package is in the compartment 21 with the door 22 closed, the pull tab 15 is grasped by an operator and pulled through lightproof slot flaps 25 (FIG. 3). The flaps 25 are positioned to complete the light seal between the door 22 and the door frame of the mechanism 20.

When the pull tab 15 is pulled across the cover 13 as indicated in FIG. 3, it detaches a major upper section of the cover 13 from the flange 12. During this tab pulling the upper portion of the package becomes completely opened (FIG. 1). The orientation of the cover fabric causes the pull tab 15 to effect removal of the upper 30–70% of the cover with a central straight line lateral separation as indicated at 26. The straight lateral line 26 may also be accomplished by tearing along a single seam or partial perforation in the cover 13. However, the oriented substrate provides many such tear lines so that if the tear wanders away from one it will follow a next one. Since the orientation by compression rolling creates thousands of such tear line elements in a substrate the transfer of the tear between adjacent ones will not cause any substantial change of size of the opening.

It will be readily apparent that with so much of the package opened within the equipment 20, it is a simple matter for handling equipment such as vacuum cups indicated at 28 in FIG. 3 and in phantom in FIG. 1 to grasp the outermost film sheet within the equipment 20. By various operators such as indicated at 29 (FIG. 3) the suction cups 28 move each sheet individually through an opening 30 (FIG. 1) in the compartment 21 toward a position where an appropriate empty cassette is waiting to be loaded.

It is clear from FIG. 1 that the remaining section of the cover 13 serves to maintain the film sheets 17 within the tray 11 so that the pickup mechanisms 28 will engage each sheet at a predeterminable location. If the sheets 17 were allowed to slip from the tray 11 or flop about in it, their position relative to the pickup mechanism would tend to vary considerably. The removal of only about ½ of the cover leaves a pocket for holding the sheets and assures exact location of each film sheet when it is picked up.

The invention has been described in detail with particular reference to preferred embodiments thereof, but it will be understood that variations and modifications can be effected within the spirit and scope of the invention as described hereinabove and as defined in the appended claims.

We claim:

1. A package suitable for shipping photosensitive film sheets, comprising:
- a rigid opaque tray portion for holding the sheets therein, said tray having a planar edge surface;
- an opaque cover sealed peripherally around said edge surface, said cover having a seam-like lateral orientation line dividing said cover into two sections; and
- a pull tab secured to the full width of one section of said cover, said pull tab being longer than the seam-like line so that it may be folded therealong to extend beyond the tray edge whereby the package can be opened when entirely enclosed in a light-tight compartment by pulling the pull tab across said cover.

2. The invention as defined in claim 1 wherein said cover is substantially weaker along one of the seam-like lines than the peripheral seal whereby the other section of said cover remains sealed to said tray to hold the sheets in place.

3. A package comprising:
- an open tray having a base member and walls disposed around the periphery of the base to define a cavity, said walls having a flange on the open side of the tray around the terminal edge thereof, said flange extending outward from said terminal edge substantially parallel to said base member;
- a cover sheet secured to said flange forming a closure for the tray, said sheet formed of a material having the property of tearing along a substantially straight line;
- a pull tab extending parallel to said line from an edge of said sheet and being of sufficient length that when folded back across said sheet said pull tab extends beyond the opposite edge of said sheet;
- whereby upon pulling said pull tab across the sheet that portion of said sheet corresponding to the width of said tab is torn along a substantially straight line and removed from said tray.

4. A package for shipping photosensitive film sheets comprising:
- an opaque tray having a planar base and walls extending around the periphery thereof for receiving film sheets therein, said walls having a planar border flange parallel to said base and extending outwardly from the open side of the tray;
- an opaque cover sealed to said flange;
- and a pull tab for removing a substantial portion of the cover, said tab being integrally secured to a first edge of said cover along a portion of said flange and having a length greater than said cover, so that when folded over the cover, the tab is accessible and can be grasped at the side opposite said first edge.

5. The invention according to claim 4 wherein said cover is a laminated membrane having the property of tearing along a substantially straight line and wherein said pull tab is longitudinally aligned in the direction of said tearing such that when said tab is pulled across said cover, the width of that portion of the cover removed from said package corresponds to the width of the pull tab.

References Cited

UNITED STATES PATENTS 2,973,087 2/1961 Rohdin ............. 206—56

GEORGE T. HALL, *Primary Examiner.*

U.S. Cl. X.R.

206—62; 229—51